(12) United States Patent
Liao et al.

(10) Patent No.: US 6,862,065 B2
(45) Date of Patent: Mar. 1, 2005

(54) TRANSFLECTIVE DISPLAY DEVICE WITH DIFFERENT PRETILT ANGLES AND FABRICATION METHOD FOR THEREOF

(75) Inventors: Chih-Chang Liao, Tainan (TW);
Yichun Wong, Tainan (TW);
Kang-Hung Liu, Hsinchu (TW);
Yang-Yi Fan, Taichung (TW)

(73) Assignee: Industrial Technology Research Institute, Hsinchu (TW)

(*) Notice: Subject to any disclaimer, the term of this patent is extended or adjusted under 35 U.S.C. 154(b) by 8 days.

(21) Appl. No.: 10/437,495

(22) Filed: May 14, 2003

(65) Prior Publication Data

US 2004/0114076 A1 Jun. 17, 2004

(30) Foreign Application Priority Data

Dec. 17, 2002 (TW) .......................... 91136410 A

(51) Int. Cl.$^7$ .............................................. G02F 1/141
(52) U.S. Cl. ..................... 349/134; 349/126; 349/114; 349/128
(58) Field of Search .................. 349/114, 128, 349/129, 134

(56) References Cited

U.S. PATENT DOCUMENTS 6,169,591 B1    1/2001   Kwon et al.
2002/0003596 A1 1/2002   Kim

*Primary Examiner*—Robert H. Kim
*Assistant Examiner*—George Y. Wang
(74) *Attorney, Agent, or Firm*—Quintero Law Office

(57) ABSTRACT

A transflective display device having a single cell gap in which a liquid crystal molecule has at least two pretilt angles. A transparent electrode is formed on the inner surface of the lower substrate, and a reflective electrode is formed on a portion of the transparent electrode, such that a reflective region is over the reflective electrode and a transmissive region is over the transparent electrode, which is not covered by the reflective electrode. The pretilt angle of the liquid crystal molecule in the reflective region is different from the pretilt angle of the liquid crystal molecule in the transmissive region, the reflective region and the transmissive region have the same phase retardation, and the light path through the reflective region is twice the light path passing through the transmissive region.

15 Claims, 7 Drawing Sheets

TRANSFLECTIVE DISPLAY DEVICE WITH DIFFERENT PRETILT ANGLES AND FABRICATION METHOD FOR THEREOF

BACKGROUND OF THE INVENTION

1. Field of the Invention

The invention relates to a transflective display device, and more particularly to a transflective display device that employs a photo-alignment process to make liquid crystal molecules have at least two pretilt angles within a single cell gap.

2. Description of the Related Art

Liquid crystal display (LCD) devices are usually classified into transmission type and reflection type according to the difference in their display light source. The transmission type LCD device uses a back light module, in which the light is incident to an LC layer and is absorbed or passes through the LC layer, thus disadvantages of faded color and reduced contrast ratio are found under a natural light source or an exterior artificial light source. On the contrary, the reflection type LCD device uses an ambient light incident from an exterior light source, resulting in superior performance and high contrast ratio under outdoor sunlight. Also, because of its low power consumption, the reflection type LCD device is focused on portable display products. However, the reflection type LCD device is useless when the weather or exterior light source is dark, and it is comparatively difficult to achieve high resolution for a full color display.

Accordingly, transflective LCD devices have developed to compensate for the reflection type LCD device and possess the advantages found in the transmission type LCD device and the reflection type LCD device. The transflective LCD device can use well known active driving processes, such as amorphous silicon thin film transistor (a-Si TFT) or low temperature polysilicon (LTPS) TFT, and is applied to information products of low power consumption. U.S. Patent Application Publication No. 2002/0003596A1 discloses a transflective LCD device that designs an LC cell as dual cell gaps and has a retardation film.

FIG. 1A is an exploded perspective view illustrating a typical transflective LCD device. FIG. 1B is a cross-sectional view illustrating dual cell gaps of the transflective LCD device shown in FIG. 1A.

In FIG. 1A, a transflective LCD device 1 includes an upper substrate 10 and a lower substrate 20 opposing each other, and an LC layer 30 is interposed therebetween. For the upper substrate 10, on an inner surface opposing the lower substrate 20, a black matrix 12 and a color filter layer 14 that includes a plurality of red (R), green (G), and blue (B) color elements are formed, and a common electrode 16 is formed to cover the color filter layer 14 and the black matrix 12.

For the lower substrate 20, on an inner surface opposing the upper substrate 10, a plurality of crossing gate lines 26 and data lines 28 are formed to define a plurality of pixel regions P arranged in a matrix and corresponding to the color filter layer 14, and a plurality of TFTs, serving as switching devices, is located near each cross point of the adjacent gate line 26 and data line 28. Also, a plurality of reflective electrodes 22 and a plurality of transparent electrodes 24 are formed on the pixel areas P, respectively. Each of the reflective electrodes 22 has a through hole to expose a transparent electrode 24 disposed there below. Thus, the exposed portion of the transparent electrode 24 serves as a transmissive region T, and the electrode portion outside the through hole serves as a reflective region R.

In FIG. 1B, the lower substrate 20 comprises a protection layer 36 sandwiched between the reflective electrode 22 and the transparent electrode 24, and the through hole passes through the reflective layer 22 and the protection layer 36 to define the transmissive region T and the reflective region R. Furthermore, an upper alignment layer 32I is formed on the common electrode 16, a lower alignment layer 32II is formed on the reflective electrode 22 and exposed portion of the transparent electrode 24. A half wave plate (HWP) 34 and an upper polarizer 38I are sequentially disposed on the exterior surface of the upper substrate 10, and a lower polarizer 38II and a back light 40 are disposed on the exterior surface of the lower substrate 20. The HWP 34 is employed to involve a phase difference of $\lambda/2$ for incident lights.

Accordingly, in the pixel area P, the LC layer 30 has a first cell gap $d_1$ over the reflective electrode 22 within the reflective region R, and a second cell gap $d_2$ over the transparent electrode 24 within the transmissive region R. The second cell gap $d_2$ is twice beneficial as the first cell gap $d_1$. Thus, a light achieves a phase difference of $\lambda/4$ after passing through the first cell gap $d_1$, and a light achieves a phase difference of $\lambda/2$ after passing through the second cell gap $d_2$. After passing through the HWP 34, the light achieves the additional phase difference of $\lambda/2$. The phase retardation in the transmissive region T is twice the phase retardation in the reflective region R.

Nevertheless, for patterning dual cell gaps in the LC layer 30, the process becomes more complicated. Also, the transflective film, such as the HWP 34, adhered to the exterior surface of the upper substrate 10 cannot achieve superior performance. Accordingly, a transflective LCD device based on a single cell gap design to achieve optical demands for both the transflective region and the reflective region is called for.

SUMMARY OF THE INVENTION

The present invention is a transflective display device based on a single cell gap design that employs a photo-alignment process to make liquid crystal molecules have at least two pretilt angles within the single cell gap, thus achieving optical demands for both the transflective region and the reflective region.

Accordingly, the present invention provides a transflective display device with different pretilt angles. An upper substrate and a lower substrate are opposed with each other and separated by a space, in which the space comprises a transmissive region and a reflective region. A first alignment layer is formed on the inner surface of the upper substrate. A transparent electrode is formed on the inner surface of the lower substrate, and a reflective electrode is formed on a portion of the transparent electrode. The reflective region is over the reflective electrode, and the transmissive region is over the transparent electrode which is not covered by the reflective electrode. A second alignment layer is formed on the reflective electrode and the exposed surface of the transparent electrode. A liquid crystal layer is formed in the space between the upper substrate and the lower substrate and sandwiched between the first alignment layer and the second alignment layer to serve as a single cell gap. The liquid crystal layer comprises a first pretilt-angle region in the reflective region and adjacent to the first alignment layer, a second pretilt-angle region in the reflective region and adjacent to the second alignment layer, a third pretilt-angle region in the transmissive region and adjacent to the first alignment layer, and a fourth pretilt-angle region in the transmissive region and adjacent to the second alignment layer. The liquid crystal molecules have at least two pretilt angles in the first pretilt-angle region, the second pretilt-angle region, the third pretilt-angle region and the fourth pretilt-angle region.

Preferably, the pretilt angle of the liquid crystal molecule in the reflective region is different from the pretilt angle of the liquid crystal molecule in the transmissive region, the reflective region and the transmissive region have the same phase retardation, and the light path passing through the reflective region is twice the light path passing through the transmissive region.

DESCRIPTION OF THE DRAWINGS

For a better understanding of the present invention, reference is made to a detailed description to be read in conjunction with the accompanying drawings.

DETAUKED DESCRIPTION OF THE INVENTION

The present invention provides a transflective display device with a single cell gap design, in which liquid crystal molecules have different pretilt angles within the single cell gap. Due to the different pretilt angles in a transflective region and a reflective region, the phase retardation of the transmissive region is identical to the phase retardation of the reflective region. One light path passing through the reflective region is twice the other light path passing through the transmissive region. In order to achieve the different pretilt angles in the liquid crystal layer, an alignment layer with a specific pattern can be provided by photo alignment, rubbing, ion beam or slanting deposition. The liquid crystal molecules are of dielectric anisotropic, twisted nematic (TN) or super twisted nematic (STN) type. Preferably, the combination of the alignment layer and the liquid crystal layer must be able to control the pretilt angle of the liquid crystal molecules.

Figure 1A:
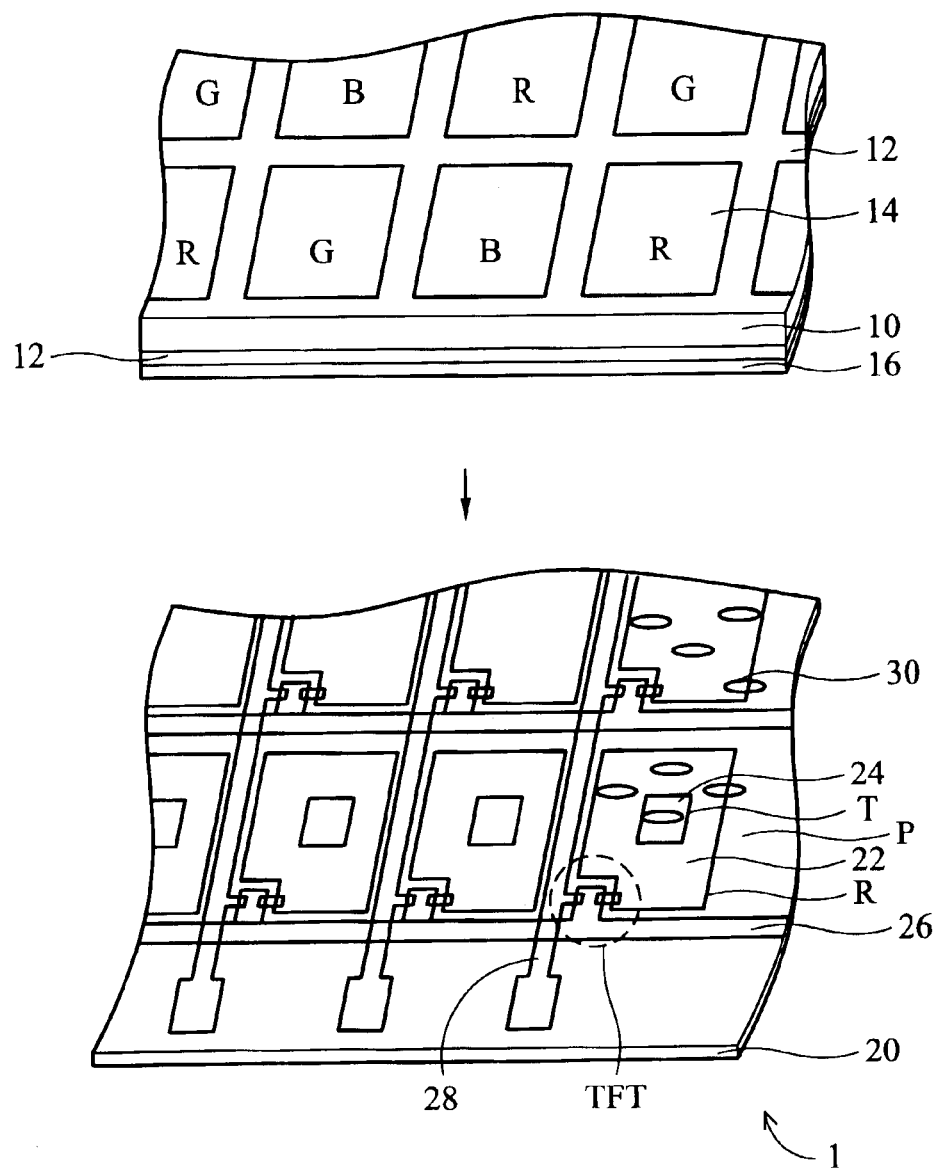
FIG. 1A is an exploded perspective view illustrating a typical transflective LCD device.
Figure 1B:
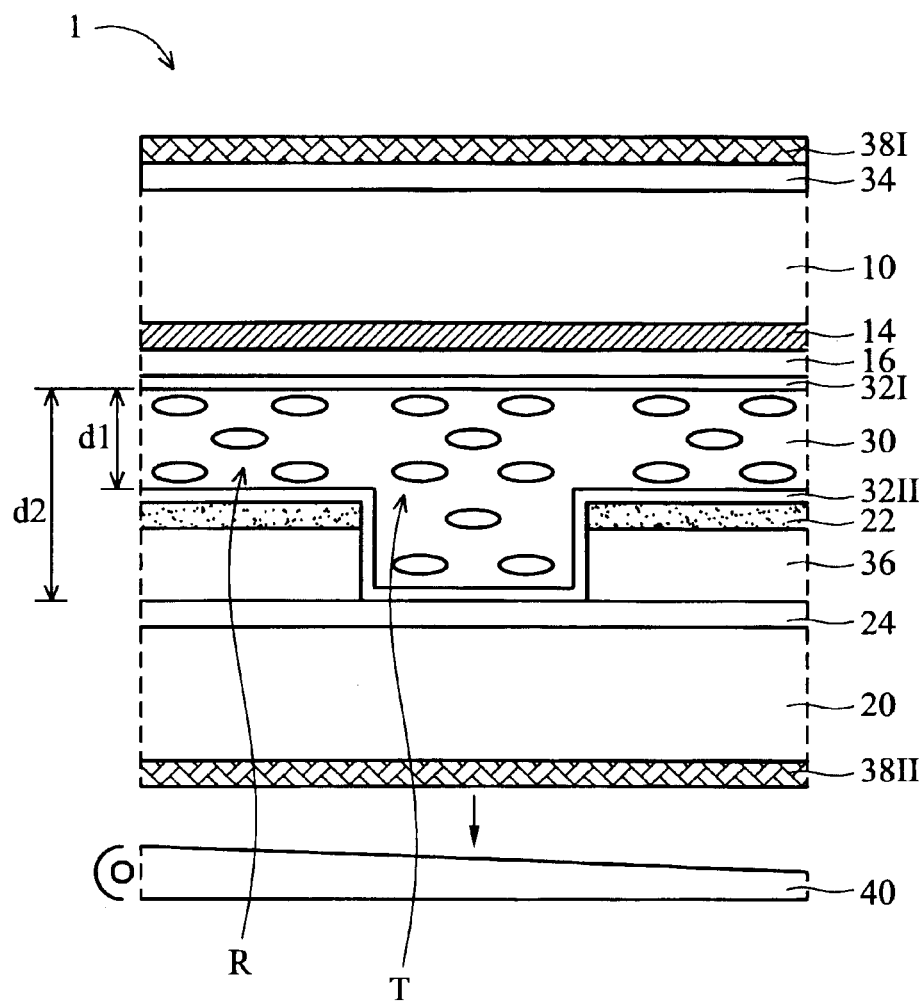
FIG. 1B is a cross-sectional view illustrating dual cell gaps of the transflective LCD device shown in FIG. 1A.
Figure 2:
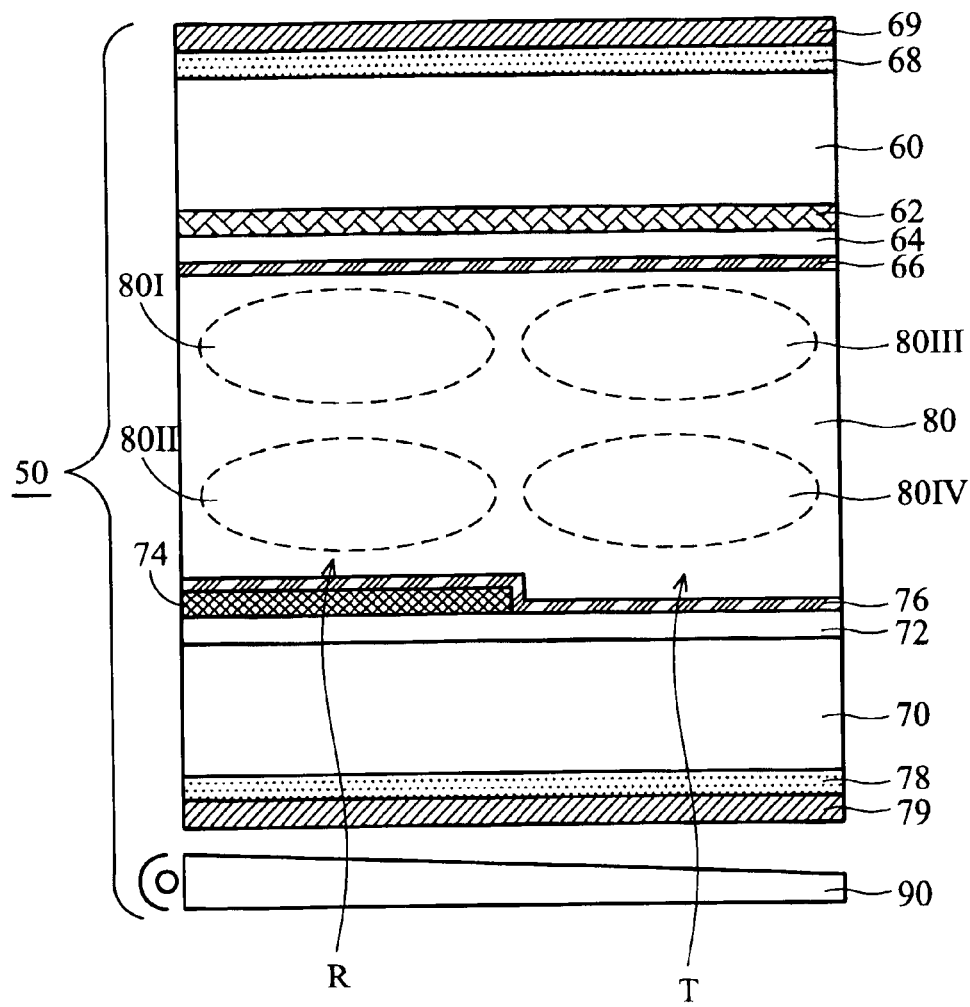
FIG. 2 is a cross-sectional view illustrating a transflective LCD device with different pretilt angles according to the present invention.

FIG. 2 is a cross-sectional view illustrating a transflective LCD device with different pretilt angles according to the present invention. A transflective LCD device 50 includes an upper substrate 60 and a lower substrate 70 that are opposed with each other, and an LC layer 80 is interposed therebetween. For the upper substrate 60, on an inner surface opposing the LC layer 80, a color filter layer 62 including a black matrix layer and a plurality of red (R), green (G), and blue (B) color elements, a common electrode 64 and a first alignment layer 66 are sequentially formed. Also, a first phase retardation plate 68 and a first polarizer 69 are sequentially disposed on the exterior surface of the upper substrate 60. The first phase retardation plate 68 is employed to involve a phase difference of 90° (or π/2) for incident light.

For the lower substrate 70, on an inner surface opposing the LC layer 80, a plurality of crossing gate lines and data lines are formed to define a plurality of pixel regions arranged in a matrix, and a plurality of TFTs are located near each cross point of two adjacent gate lines and data lines. Also, each of the pixel areas comprises a transparent electrode 72 formed on the lower substrate 70, a reflective electrode 74 patterned on the transparent electrode 72, and a second alignment layer 76 formed on the exposed surface of the transparent electrode 72 and the reflective electrode 74. Preferably, the area of the reflective electrode 74 is smaller than the area of the transparent electrode 72, thus the reflective electrode 74 covers a portion of the transparent electrode 74. The LC layer 80 over the exposed portion of the transparent electrode 72 serves as a transmissive region T, and the LC layer 80 over the reflective electrode 74 serves as a reflective region R. Moreover, a second phase retardation plate 78, a second polarizer 79 and a back light 90 are sequentially disposed on the exterior surface of the lower substrate 70. The second phase retardation plate 78 is employed to involve a phase difference of 90° (or π/2) for incident light.

Generally, the LC layer 80 of approximately 4 μm in thickness is much thicker than the reflective electrode 74 of approximately 1.0 μm in thickness, thus the LC layer 80 is certainly viewed as a single cell gap within each pixel area. According to the different pretilt angles of liquid crystal molecules, the LC layer 80 provides a first pretilt-angle region 80I and a second pretilt-angle region 80II within the reflective region R, and a third pretilt-angle region 80III and a fourth pretilt-angle region 80IV within the transmissive region R. Also, the first pretilt-angle region 80I and third pretilt-angle region 80III are adjacent to the first alignment layer 66, and the second pretilt-angle region 80II and the fourth pretilt-angle region 80IV are adjacent to the second alignment layer 76.

The present invention uses a photo-alignment process to adjust patterns on the alignment layers 66 and 76 so as to control the pretilt-angle difference between the four pretilt-angle regions 80I, 80II, 80III and 80IV. Preferably, the LC layer 80 provides as least two pretilt angles to make the phase retardation of the transmissive region T identical to the phase retardation of the reflective region R. Thus, one light path passing through the reflective region R is twice the other light path passing through the transmissive region T.

According to the photo-alignment process and the pattern design for the alignment layers 66 and 76, the LC layer 80 may serve as a quadriple pretilt-angle structure, a triple pretilt-angle structure or a dual pretilt-angle structure. Various modes of the multi pretilt-angle structure are described hereinafter with references in FIGS. 3A, 3B and 3C.

Figure 3A:
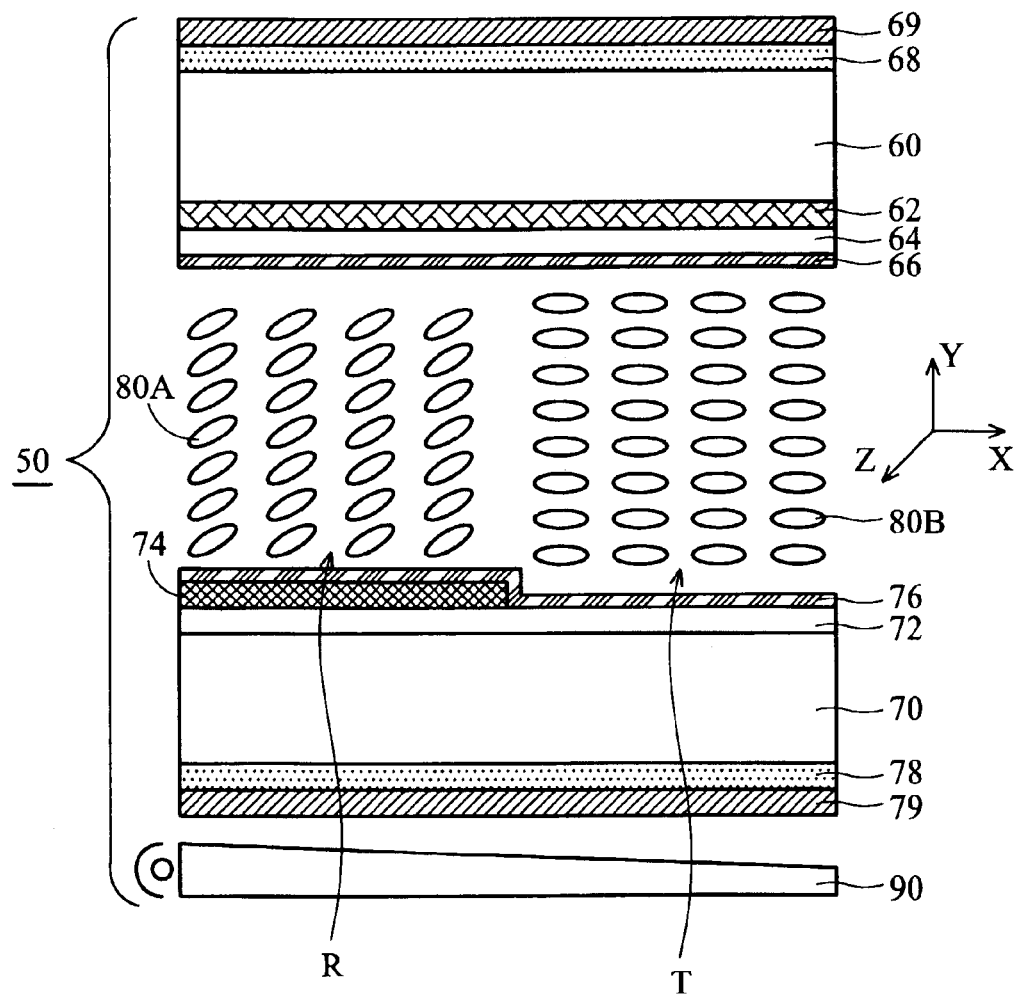
FIG. 3A is a cross-sectional view illustrating a transflective LCD device with a dual pretilt-angle structure according to the present invention.

FIG. 3A is a cross-sectional view illustrating a transflective LCD device with a dual pretilt-angle structure according to the present invention. For the reflective region R, a first LC molecule 80A, within the first pretilt-angle region 80I and the second pretilt-angle region 80II, tilts steeply to have a first pretilt angle (an included angle between X axis and the long axis of LC molecule) of 40°~45°. Meanwhile, for the transmissive region T, a second LC molecule 80B, within the third pretilt-angle region 80III and the fourth pretilt-angle region 80IV, tilts gradually to have a second pretilt angle (an included angle between X axis and the long axis of LC molecule) of 0°~7°. Proved by experimental simulation, the first LC molecule 80A the second LC molecule 80B have different pretilt angles that effectively compensates for the difference of phase retardation between the reflective region R and the transmissive region T. Compared with the conventional dual cell gaps with the single pretilt-angle structure, the present invention develops the dual pretilt-angle structure within the single cell gap to prevent complicated processes and achieve a superior display result.

Figure 3B:
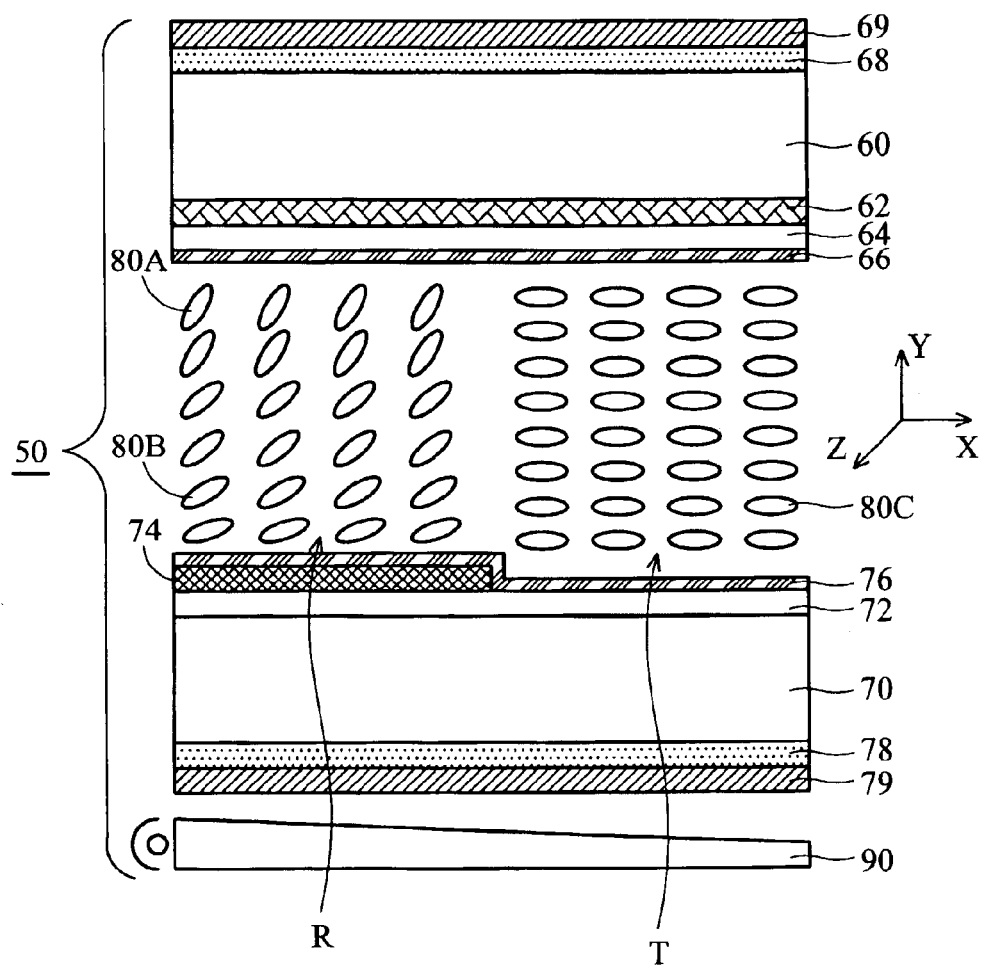
FIG. 3B is a cross-sectional view illustrating a transflective LCD device with a triple pretilt-angle structure according to the present invention.

FIG. 3B is a cross-sectional view illustrating a transflective LCD device with a triple pretilt-angle structure according to the present invention. For the reflective region R, a first LC molecule 80A within the first pretilt-angle region 80I tilts more steeply to have a first pretilt angle (an included angle between X axis and the long axis of LC molecule) of 60°~85°, and a second LC molecule 80B within the second pretilt-angle region 80II tilts steeply to have a second pretilt angle (an included angle between X axis and the long axis of LC molecule) of 40°~45°. Meanwhile, for the transmissive region T, a third LC molecule 80C, within the third pretilt-angle region 80III and the fourth pretilt-angle region 80IV, tilts gradually to have a third pretilt angle (an included angle between the X axis and the long axis of LC molecule) of 0°~7°. Proved by experimental simulation, the first LC molecule 80A, the second LC molecule 80B and the third LC molecule 80C have three pretilt angles that effectively compensate for the difference of phase retardation between the reflective region R and the transmissive region T.

Figure 3C:
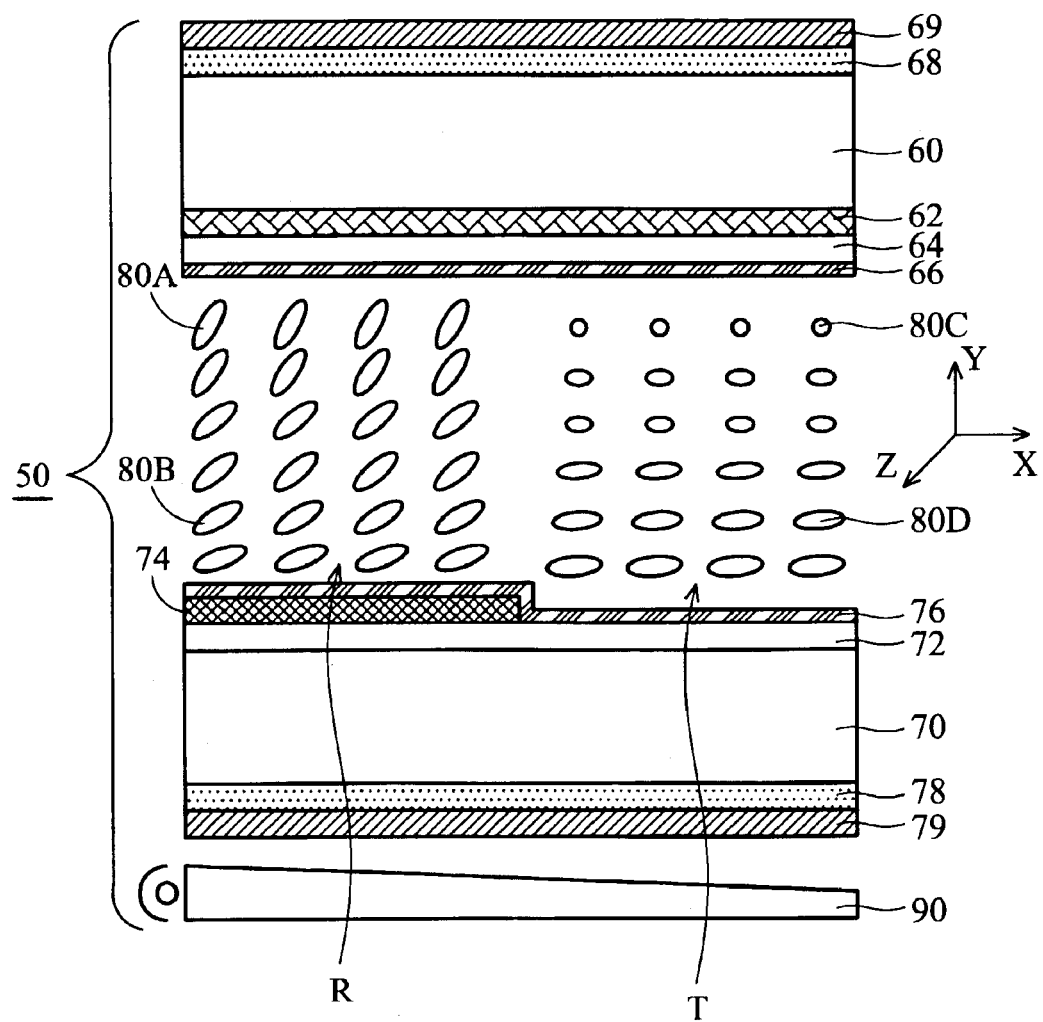
FIG. 3C is a cross-sectional view illustrating a transflective LCD device with a quadriple pretilt-angle structure according to the present invention.

FIG. 3C is a cross-sectional view illustrating a transflective LCD device with a quadriple pretilt-angle structure according to the present invention. For the reflective region R, a first LC molecule 80A within the first pretilt-angle region 80I tilts more steeply to have a first pretilt angle (an included angle between X axis and the long axis of LC molecule) of 60°~85°, and a second LC molecule 80B within the second pretilt-angle region 80II tilts steeply to have a second pretilt angle (an included angle between X axis and the long axis of LC molecule) of 40°~45°. Meanwhile, for the transmissive region T, a third LC molecule 80C within the third pretilt-angle region 80III tilts to make its long axis parallel to the Z axis, and a fourth LC molecule 80D within the fourth pretilt-angle region 80IV tilts gradually to have a third pretilt angle (an included angle between X axis and the long axis of LC molecule) of 0°~7°. Proved by experimental simulation, the first LC molecule 80A, the second LC molecule 80B, the third LC molecule 80C and the fourth LC molecule 80D have four pretilt angles that effectively compensate for the difference of phase retardation between the reflective region R and the transmissive region T.

In addition, in photo-alignment processing for designing the pattern of the alignment layers 66 and 76, a UV aligner with a multi-domain photo mask is employed to dominate exposure levels on a photosensitive polymer based alignment material, thus modulates the patterns on the alignment layers 66 and 76 to benefit the multi pretilt-angle structures. The photo-alignment process is described as follows.

Figure 4:
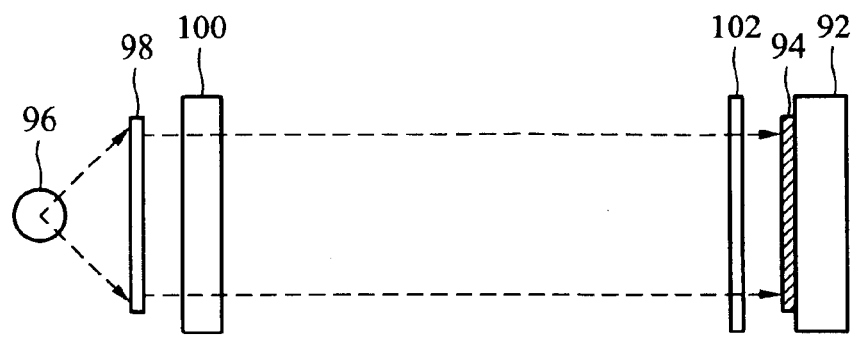
FIG. 4 is a cross-sectional view illustrating a photo-alignment method.
Figure 5A:
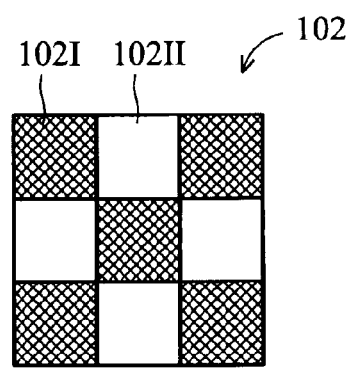
FIG. 5A is a plane view of a pattern on a multi-domain photo mask of FIG. 4.
Figure 5B:
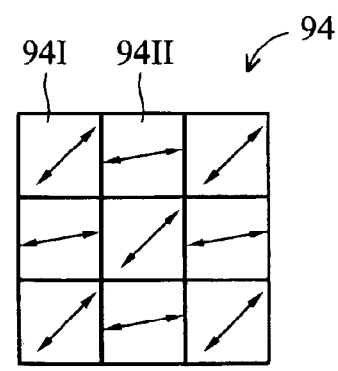
FIG. 5B is a plane view of a pattern on an alignment layer of FIG. 4.

FIG. 4 is a cross-sectional view illustrating a photo-alignment method. FIG. 5A is a plane view of a pattern on a multi-domain photo mask of FIG. 4. FIG. 5B is a plane view of a pattern on an alignment layer of FIG. 4. First, a substrate 92 is provided with a photo-alignment film 94 formed thereon. Then, a light source 96 is provided and the radiated light (as shown by the dotted lines) passes through a polarizer 98, a condenser 100 and a multi-domain photo mask 102. The multi-domain photo mask 102 comprises a plurality of first regions 102I that permit the incident light toward a first direction to pass through, and a plurality of second regions 102II that permits the incident light toward a second direction to pass through. By modulating the exposure level, a plurality of first alignment domains 94I corresponding to the first regions 102I is transferred to the photo-alignment film 94, thus the LC molecules over the first alignment domains 94I have a first pretilt angle (as shown by an arrow in the first alignment domain 94I). In the meanwhile, and a plurality of second alignment domains 94II corresponding to the second regions 102II is transferred to the photo-alignment film 94, thus the LC molecules over the second alignment domains 94II have a second pretilt angle (as shown by an arrow in the second alignment domain 94II).

By modifying the pattern on the multi-domain photo mask 102 and modulating the exposure levels, the above-described photo-alignment process is also applied to the triple pretilt-angle structure and the quadriple pretilt-angle structure.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A transflective display device with different pretilt angles, comprising:

an upper substrate and a lower substrate opposed with each other and separated by a space, in which the space comprises a transmissive region and a reflective region;

a first alignment layer formed on the inner surface of the upper substrate;

a transparent electrode formed on the inner surface of the lower substrate;

a reflective electrode formed on a portion of the transparent electrode, wherein the reflective region is over the reflective electrode, and the transmissive region is over the transparent electrode which is not covered by the reflective electrode;

a second alignment layer formed on the reflective electrode and the exposed surface of the transparent electrode;

a liquid crystal layer formed in the space between the upper substrate and the lower substrate and sandwiched between the first alignment layer and the second alignment layer, in which the liquid crystal layer serves as a single cell gap;

wherein, the liquid crystal layer comprises a first pretilt-angle region in the reflective region and adjacent to the first alignment layer;

wherein, the liquid crystal layer comprises, a second pretilt-angle region in the reflective region and adjacent to the second alignment layer;

wherein, the liquid crystal layer comprises a third pretilt-angle region in the transmissive region and adjacent to the first alignment layer;

wherein, the liquid crystal layer comprises a fourth pretilt-angle region in the transmissive region and adjacent to the second alignment layer; and wherein, the liquid crystal molecules have at least two pretilt angles in the first pretilt-angle region, the second pretilt-angle region, the third pretilt-angle region, and the fourth pretilt-angle region.

2. The transflective display device with different pretilt angles of claim 1, wherein the pretilt angle of the liquid crystal molecule in the reflective region is different from the pretilt angle of the liquid crystal molecule in the transmissive region, the reflective region and the transmissive region have the same phase retardation, and the light path passing through the reflective region is twice the light path passing through the transmissive region.

3. The transflective display device with different pretilt angles of claim 1, wherein the liquid crystal layer comprises:

a first liquid crystal molecule in the first pretilt-angle region and the second pretilt-angle region; and a second liquid crystal molecule in the third pretilt-angle region and the fourth pretilt-angle region;

wherein, the pretilt angle of the first liquid crystal molecule is different from the pretilt angle of the second liquid crystal molecule.

4. The transflective display device with different pretilt angles of claim 3, wherein the pretilt angle of the first liquid crystal molecule is larger than the pretilt angle of the second liquid crystal molecule.

5. The transflective display device with different pretilt angles of claim 4, wherein the pretilt angle of the first liquid crystal molecule is 40°~45°, and the pretilt angle of the second liquid crystal molecule is 0°~7°.

6. The transflective display device with different pretilt angles of claim 1, wherein the liquid crystal layer comprises:

a first liquid crystal molecule in the first pretilt-angle region;

a second liquid crystal molecule in the second pretilt-angle region; and a third liquid crystal molecule in the third pretilt-angle region and the fourth pretilt-angle region;

wherein, the pretilt angle of the first liquid crystal molecule, the pretilt angle of the second liquid crystal molecule, and the pretilt angle of the third liquid crystal molecule are different from each other.

7. The transflective display device with different pretilt angles of claim 6, wherein the pretilt angle of the first liquid crystal molecule is larger than the pretilt angle of the second liquid crystal molecule, and the pretilt angle of the second liquid crystal molecule is larger than the pretilt angle of the third liquid crystal molecule.

8. The transflective display device with different pretilt angles of claim 7, wherein the pretilt angle of the first liquid crystal molecule is 60°~85°, the pretilt angle of the second liquid crystal molecule is 40°~45° and the pretilt angle of the third liquid crystal molecule is 0°~7°.

9. The transflective display device with different pretilt angles of claim 1, wherein the liquid crystal layer comprises:

a first liquid crystal molecule in the first pretilt-angle region;

a second liquid crystal molecule in the second pretilt-angle region;

a third liquid crystal molecule in the third pretilt-angle region;

a fourth liquid crystal molecule in the fourth pretilt-angle region;

wherein, the pretilt angle of the first liquid crystal molecule, the pretilt angle of the second liquid crystal molecule, the pretilt angle of the third liquid crystal molecule, and the pretilt angle of the fourth liquid crystal molecule are different from each other.

10. The transflective display device with different pretilt angles of claim 9, wherein, the first liquid crystal molecule has a first pretilt angle, in which an included angle between the X axis and the long axis of the first liquid crystal molecule is 60°~85°;

wherein, the second liquid crystal molecule has a second pretilt angle, in which an included angle between the X axis and the long axis of the second liquid crystal molecule is 40°~45°;

wherein, the third liquid crystal molecule has a third pretilt angle, in which the long axis of the third liquid crystal is parallel to the Z axis; and wherein, the fourth liquid crystal molecule has a fourth pretilt angle, in which an included angle between the X axis and the long axis of the fourth liquid crystal molecule is 0°~7°.

11. The transflective display device with different pretilt angles of claim 1, wherein each the first alignment layer and the second alignment layers is a photo-alignment film on which at least two alignment domains are patterned.

12. The transflective display device with different pretilt angles of claim 1, further comprising:

a color filter layer formed on the inner surface of the upper substrate; and a common electrode formed on the color filter layer;

wherein, the color filter layer and the common electrode are sandwiched between the upper substrate and the first alignment layer.

13. The transflective display device with different pretilt angles of claim 1, further comprising:

a first phase retardation plated disposed on the exterior surface of the upper substrate; and a first polarizer disposed on the first phase retardation;

wherein, the first phase retardation plate involves a phase difference of 90° or π/2 for incident light.

14. The transflective display device with different pretilt angles of claim 1, further comprising:

a second phase retardation plate disposed on the exterior surface of the lower substrate; and a second polarizer disposed on the second phase retardation;

wherein, the second phase retardation plate involves a phase difference of 90° or π/2 for incident light.

15. The transflective display device with different pretilt angles of claim 1, further comprising a back light disposed on the exterior surface of the lower substrate.

* * * * *